United States Patent
Kumar et al.

(10) Patent No.: US 9,519,481 B2
(45) Date of Patent: Dec. 13, 2016

(54) BRANCH SYNTHETIC GENERATION ACROSS MULTIPLE MICROARCHITECTURE GENERATIONS

(71) Applicant: International Business Machines Corporation, Armonk, NY (US)

(72) Inventors: Prathiba Kumar, Udumalpet (IN); Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 14/316,900

(22) Filed: Jun. 27, 2014

(65) Prior Publication Data

US 2015/0378728 A1     Dec. 31, 2015

(51) Int. Cl.
*G06F 9/30* (2006.01)
*G06F 9/44* (2006.01)
*G06F 11/36* (2006.01)

(52) U.S. Cl.
CPC ............. *G06F 9/30058* (2013.01); *G06F 8/30* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 9,104,402 B2 | 8/2015 | Madampath et al. | |
| 2014/0143736 A1* | 5/2014 | Huang | G06Q 10/0637 715/854 |

FOREIGN PATENT DOCUMENTS

| | | |
|---|---|---|
| EP | 1378825 B1 | 4/2010 |
| WO | 2013136679 A1 | 9/2013 |

OTHER PUBLICATIONS

Kumar et al., "Branch Synthetic Generation Across Multiple Microarchitecture Generations", U.S. Appl. No. 15/060,633, filed Mar. 4, 2016.
Appendix P—List of IBM Patents or Patent Applications Treated as Related. 2 pages.

* cited by examiner

*Primary Examiner* — William B Partridge
(74) *Attorney, Agent, or Firm* — David B. Woycechowsky (57) ABSTRACT

Branch sequences for branch prediction performance test are generated by performing the following steps: (i) generating a branch node graph, by a branch node graph generator machine logic set, based, at least in part, upon a set of branch traces of a workload or benchmark code; (ii) generating a first assembly pattern file, for use with a first instruction set architecture (ISA)/microarchitecture set, by an assembly pattern generator machine logic set, based, at least in part, upon the branch node graph so as to mimic the control-flow pattern of the workload or benchmark code; and (iii) running the assembly pattern file on the first ISA/microarchitecture set to obtain first execution results.

5 Claims, 9 Drawing Sheets

BRANCH SYNTHETIC GENERATION ACROSS MULTIPLE MICROARCHITECTURE GENERATIONS

BACKGROUND OF THE INVENTION

The present invention relates generally to the field of branch pattern (or "se-quences") for workloads, and more particularly to execution of branch sequences on microarchitecture.

Understanding the core performance of a competitor's processor: (i) is potentially quite useful in the current market when designing the next generation of microprocessors; and (ii) can give companies that design processors and/or software a competitive advantage. It is very difficult to evaluate the branch performance across multiple generations of microarchitecture. It can also be helpful for a company to understand the improvements made by a competitor when the performance of various benchmarks and industry applications out-perform their own systems.

A Conventional computer program has a control flow. The control flow is a path taken by the processor through the program code. This path is designated by the program's algorithm, plus input data. When the program gets converted to machine language (assembly language), it is the branch instructions that enable this control flow. Modern microprocessors achieve much of their impressive performance by determining, prior to actual execution, the following: (i) the control flow direction (that is, determination of whether a given jump should be made); and (ii) path (that is, to exactly which destination should a given jump be made). This is one technique by which some conventional microprocessors work their way ahead without waiting for branches to get resolved (that is, to have known branch resolutions). However, the making of these control flow and path predictions is not always straightforward. Indirect branches can allow program flow to jump to instruction addresses that are determined at runtime. This branch prediction (for a particular branch based on that branch's instruction address) is conventionally based on: (i) previous behavior; and (ii) the path taken to reach this branch. Simply put, conventional branch prediction works largely on the basis of history, which is to say, previous behavior.

Processor speculation design and branch prediction is a focus of various chip makers in recent times. Close to perfect branch prediction helps improve the performance and to exploit the underlying instruction level parallelism. Branch prediction also helps avoid flushes in the pipeline which can cause a lot of wasted work. Improvements made in the area of branch prediction and speculation design by electronic chip manufacturers has resulted in great performance improvements.

In the field of computer engineering, microarchitecture is the way that an ISA (instruction set architecture) is implemented on a processor. Typically, any given ISA may be implemented with different microarchitectures, where implementations may vary due to the goals of a given design or due to ongoing changes in technology. Decisions on microarchitecture design directly affect what elements are used in a system. The design considerations include but are not limited to component cost, component size, power requirements, complexity of the logic, connectivity, manufacturability, testability and simplification of debugging.

SUMMARY

According to an aspect of the present invention, there is a method, system and/or computer program product that performs the following steps (not necessarily in the following order): (i) generating a branch node graph, by a branch node graph generator machine logic set, based, at least in part, upon a set of branch traces; (ii) generating a first assembly pattern file, for use with a first instruction set architecture (ISA)/microarchitecture set, by an assembly pattern generator machine logic set, based, at least in part, upon the branch node graph; and (iii) running the assembly pattern file on the first ISA/microarchitecture set to obtain first execution results. In some embodiments, the first assembly pattern file causes, in execution, a control-flow pattern that mimics a control-flow pattern of a benchmark code set precisely on multiple platforms.

DETAILED DESCRIPTION

Some embodiments of the present invention create an accurate branch pattern of a customer workload which can be applied across various: (i) multiple generations of the same ISA (instruction software blocks); and/or (ii) different types of microarchitecture. As used herein, the term "ISA/microarchitecture set" will refer to a set of hardware and/or software that is characterized by a given: (i) ISA type; and (ii) microarchitecture type. IA-32, generation 2 is an example of a well-known ISA. Commercially available computer microarchitectures are designed to implement IA-32. Accordingly, some embodiments of the present invention can generate an accurate pattern of a customer workload that can be applied to commercially available microarchitecture sets.

Some embodiments of the present invention also generate and/or utilize one or more of the following: (i) node graph table; (ii) conditional pattern table; (iii) static address table; and/or (iv) dynamic address table.

This Detailed Description section is divided into the following sub-sections: (i) The Hardware and Software Environment; (ii) Example Embodiment; (iii) Further Comments and/or Embodiments; and (iv) Definitions.

I. The Hardware And Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order toperform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
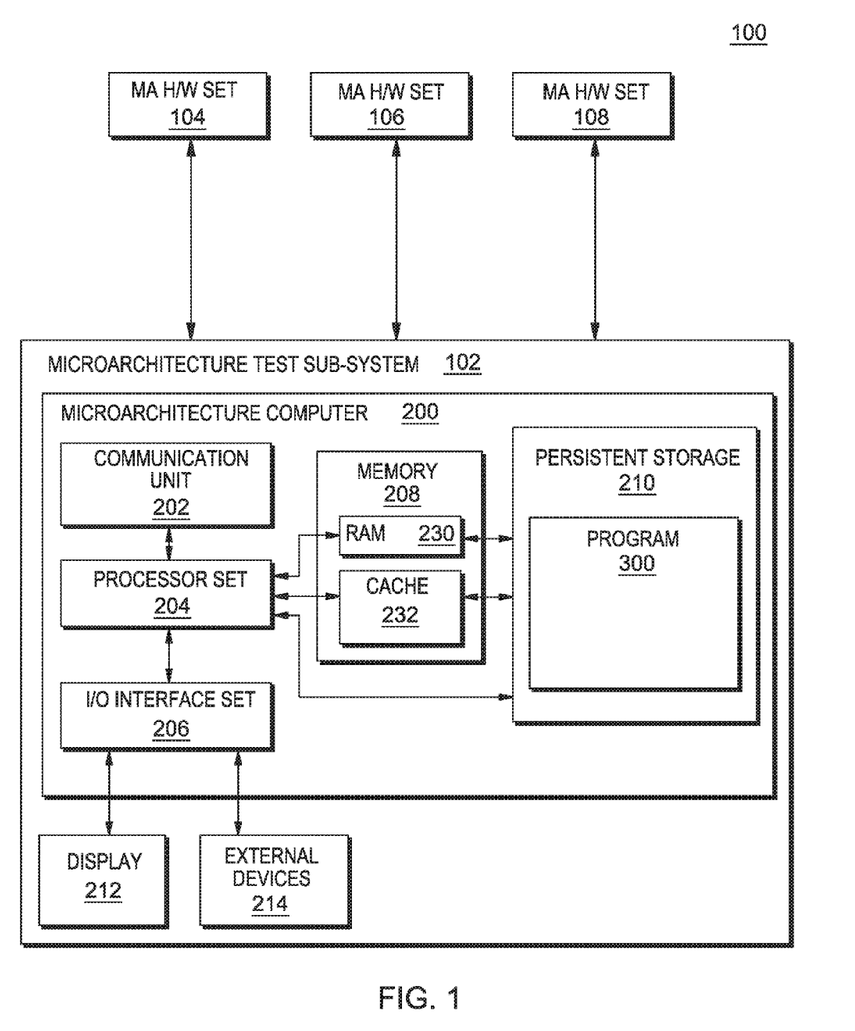
FIG. 1 is a schematic view of a first embodiment of a system according to the present invention.

An embodiment of a possible hardware and software environment for software and/or methods according to the present invention will now be described in detail with reference to the Figures. FIG. 1 is a functional block diagram illustrating various portions of microarchitecture test system 100, including: microarchitecture test sub-system 102; ISA/microarchitecture sets (also sometimes referred to as microarchitecture hardware sets) 104, 106, 108; microarchitecture test computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device. Program 300 is a collection of machine readable instructions and/or data that is used to create, manage and control certain software functions that will be discussed in detail, below, in the Example Embodiment sub-section of this Detailed Description section.

Sub-system 102 is capable of communicating with microarchitecture hardware sets 104, 106, 108. In this embodiment, the microarchitecture hardware sets are in direct data communication with microarchitecture test sub-system 102. Alternatively, this data communication may be performed through a network (for example, local area network, wide area net-work).

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
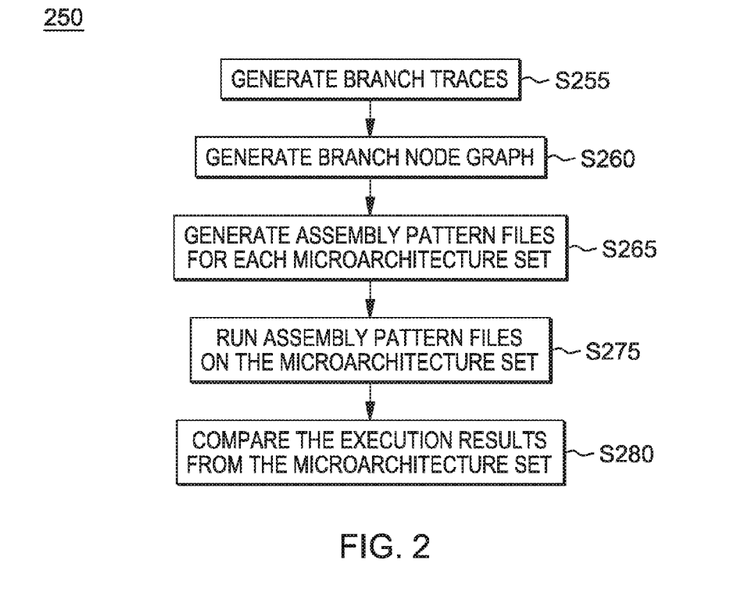
FIG. 2 is a flowchart showing a method performed, at least in part, by the first embodiment system.
Figure 3:
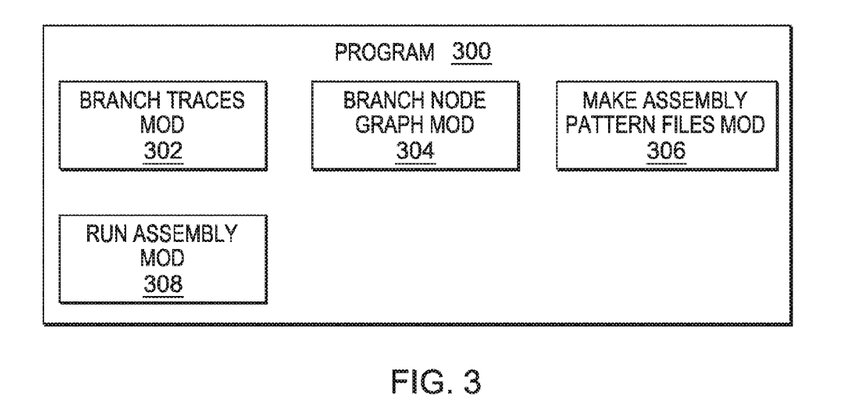
FIG. 3 is a schematic view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where branch traces module ("mod") 302 generates a set of branch traces in any way currently conventional or to be developed in the future. The Further Comments And/Or Embodiments sub-section, below, of this Detailed Description section gives a more specific example of the generation of a set of branch traces.

Processing proceeds to step S260, where branch node graph mod 304 generates a branch node graph based on the branch traces. The Further Comments And/Or Embodiments sub-section, below, of this Detailed Description section gives a more specific example of the generation of a branch node graph.

Processing proceeds to step S265, where make assembly pattern files mod 306 generates three assembly pattern files to be respectively used on ISA/microarchitecture sets 104, 106, 108 (see FIG. 1). In this example: (i) ISA microarchitecture sets 104 and 106 have the same ISA type, but different microarchitecture sets; and (ii) ISA/microarchitecture set 108 has different ISA as well as a different microarchitecture. For the foregoing reasons, three assembly pattern files are generated at step S265. However, it is noted that all three of these assembly pattern files are based on the same branch node graph (previously generated at step S260).

Figure 4:
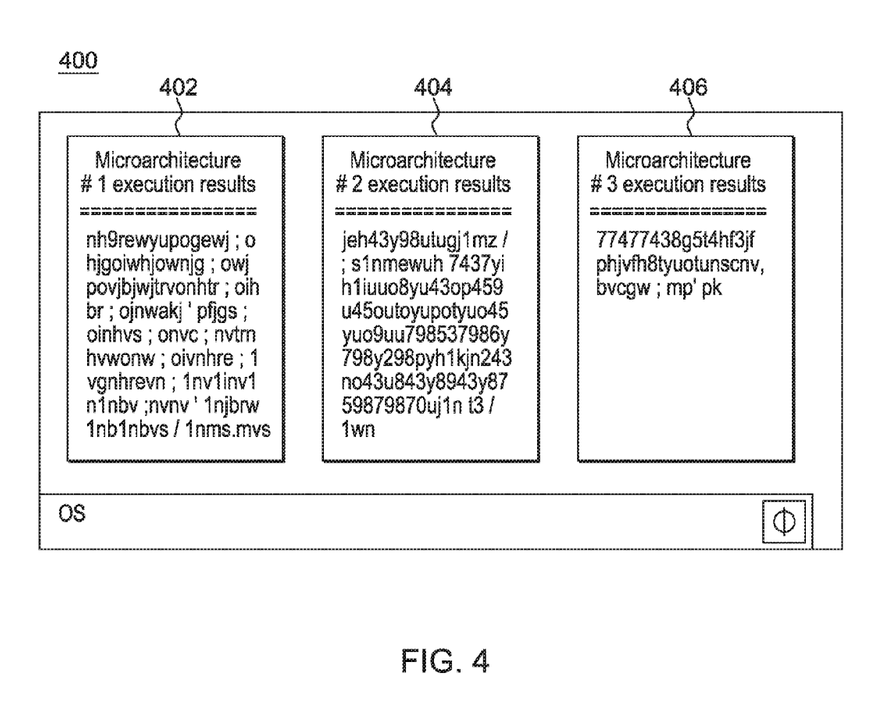
FIG. 4 is a screenshot view generated by the first embodiment system.

Processing proceeds to step S275, where run assembly mod 308 runs the three assembly pattern files on the three respective ISA/microarchitecture sets 104, 106, 108, which by running the assembly pattern files (based on a common branch node graph) on the various ISA/microarchitecture sets 104, 106, 108 (see FIG. 1), execution results are obtained. The execution results for this example are shown in FIG. 4 at screenshot 400, specifically, windows 402, 404, 406.

Processing proceeds to step S280, where the various execution results 402, 404, 406 are compared to gain information and/or insight about how the various ISA/microarchitecture sets work, and their relative performance to each other. Because the assembly pattern files are based upon a common branch node graph, this comparison will, at least in some embodiments, tend to be more direct, accurate and "apples to apples" than what is possible with currently conventional ISA/microarchitecture set test systems. In this example, the comparison is performed by a human who has access to the information shown in screenshot 400. In other embodiments, this comparison may be done, in whole or in part, by machine logic (for example, software).

III. Further Comments and/or Embodiments

Some embodiments of the present invention may recognize one, or more, of the following potential problems, drawbacks, or opportunities for improvement with respect to the state of the art: (i) competitors are reluctant to reveal information about their microarchitecture design in open forums; (ii) it is very difficult to evaluate and/or compare the branch performance across multiple generations of microarchitecture; (iii) no one publishes the algorithm(s) being used in their microarchitecture hardware; (iv) it is very difficult to unveil the algorithm(s) from the hardware unless there is published data from the designer; (v) hardware performance counters only extract primitive levels of detail; (vi) the details extracted by hardware performance counters are limited by the number of defined events; and/or (vii) hardware performance counters only provide accumulated numbers.

Some embodiments of the present invention may further recognize one, or more, of the following potential problems, drawbacks, or opportunities for improvement with respect to the state of the art: (i) when two applications are compared using the raw hardware counter, the data supplied is only a consolidated view of how much a competitors hardware is better; (ii) when two applications are compared using the raw hardware counter, no information is provided about why certain patterns are predicted more accurately by ISA/microarchitecture sets relative to other ISA/microarchitecture sets; (iii) when two applications are compared using the raw hardware counter, this requires that a very similar pattern be used in both hardware sets, where the pattern should match closely from one to the other; (iv) in a hardware comparison, it is very difficult to generate an exact pattern to be performed by compiling a real world application or industry standard benchmark, given the differences in ISA (instruction set architecture), compiler, and/or various software level/complier optimization; (v) it is difficult to do an "apples-to-apples" comparison of the hardware algorithms implemented in two different microprocessors; and/or (vi) conventional solutions do not generate a decisive branch pattern at an assembly language level.

Some embodiments of the present invention may include one, or more, of the following features, characteristics and/or advantages: (i) create a completely and totally accurate branch pattern (sequences), of an industry standard benchmark/customer workload, which can be performed on various generations of microarchitecture; (ii) create a completely and totally accurate branch pattern (sequences), of an industry standard benchmark/customer workload, which can be performed on competitors hardware to evaluate improvements; (iii) create a completely and totally accurate branch pattern (sequences), of an industry standard benchmark/customer workload, which can be performed to understand the competitors improvements in the branch prediction; (iv) create a completely and totally accurate branch pattern (sequences), of an industry standard benchmark/customer workload, which can be performed to understand the competitors improvements in the space of processor speculation design; (v) gives a detailed picture of how to create branch sequences as an assembly file, which can be assembled and performed in multiple hardware sets, by performing an apples-to-apples hardware comparison on a competitor's processor; and/or (vi) evaluate the improvements across various generations of microarchitecture.

Some embodiments of the present invention may further include one, or more, of the following features, characteristics and/or advantages: (i) assist in understanding improvements made on a branch prediction algorithm across numerous generations of microprocessors; (ii) the algorithm is very generic, and thus can be applied across multiple architecture variants or different ISAs which are the instructions executable on a processor; (iii) assembly language patterns are uniquely generated by using the node graph information, where the assembly language patterns are free from other instructions; (iv) the ability to analyze the branch prediction algorithms without any interference from other units; and/or (v) the inability for branch prediction algorithms to be tested in a fairly comparable manner by existing products, like normal compilers, due to highly configured computer code.

Some embodiments of the present invention may further recognize that information about the branch prediction algorithm may be useful for competing companies to: (i) evaluate branch performance across various generations of microarchitecture in the space of processor design; (ii) compare microarchitecture performance; and/or (iii) assist in understanding microarchitecture processor design.

Some embodiments of the present invention process the benchmark binary of the traces to extract only the branch trace details from the original benchmark/trace.

Figure 5A:
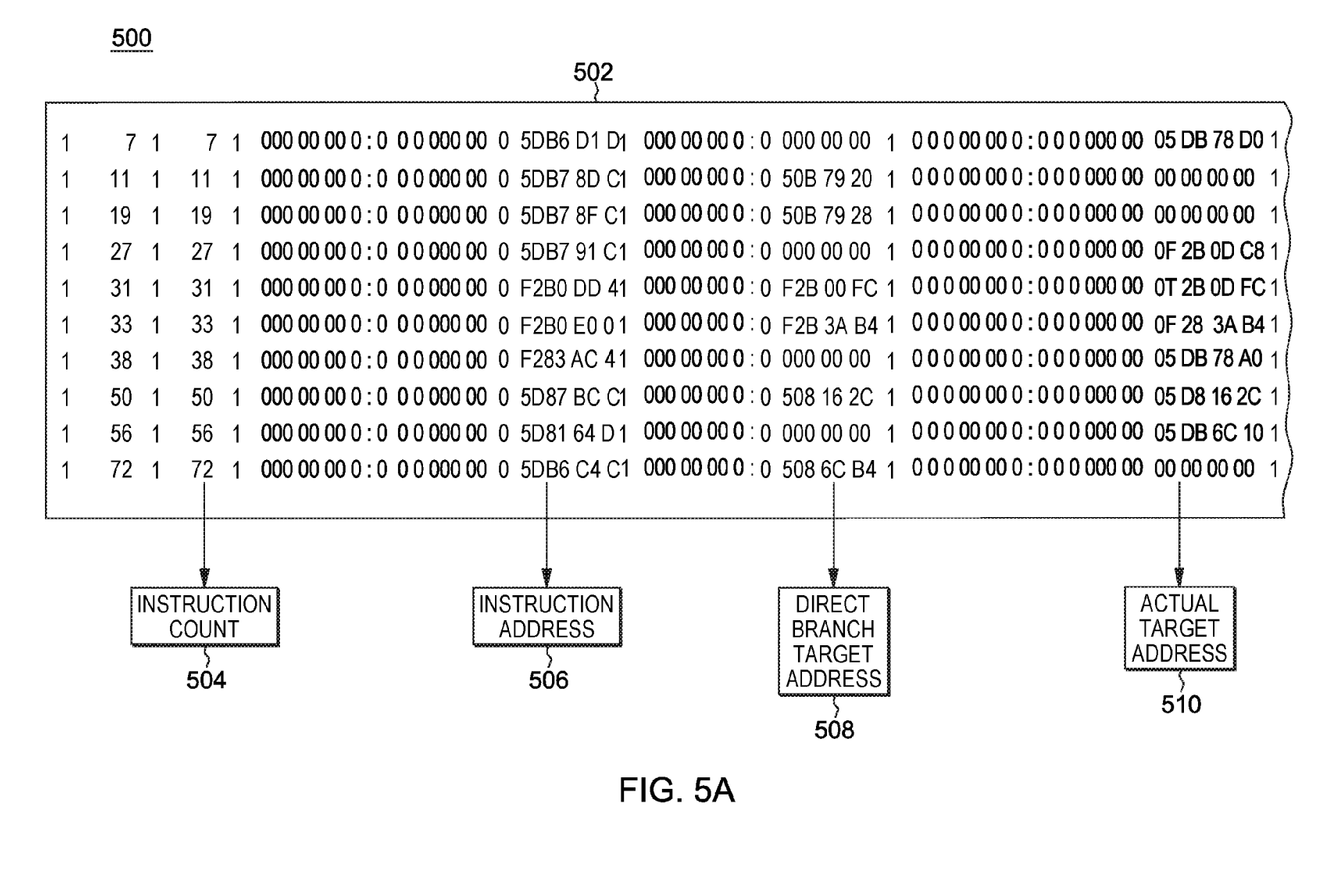
FIGS. 5A and 5B are portions of a diagram helpful in understanding various embodiments according to the present invention.
Figure 5B:
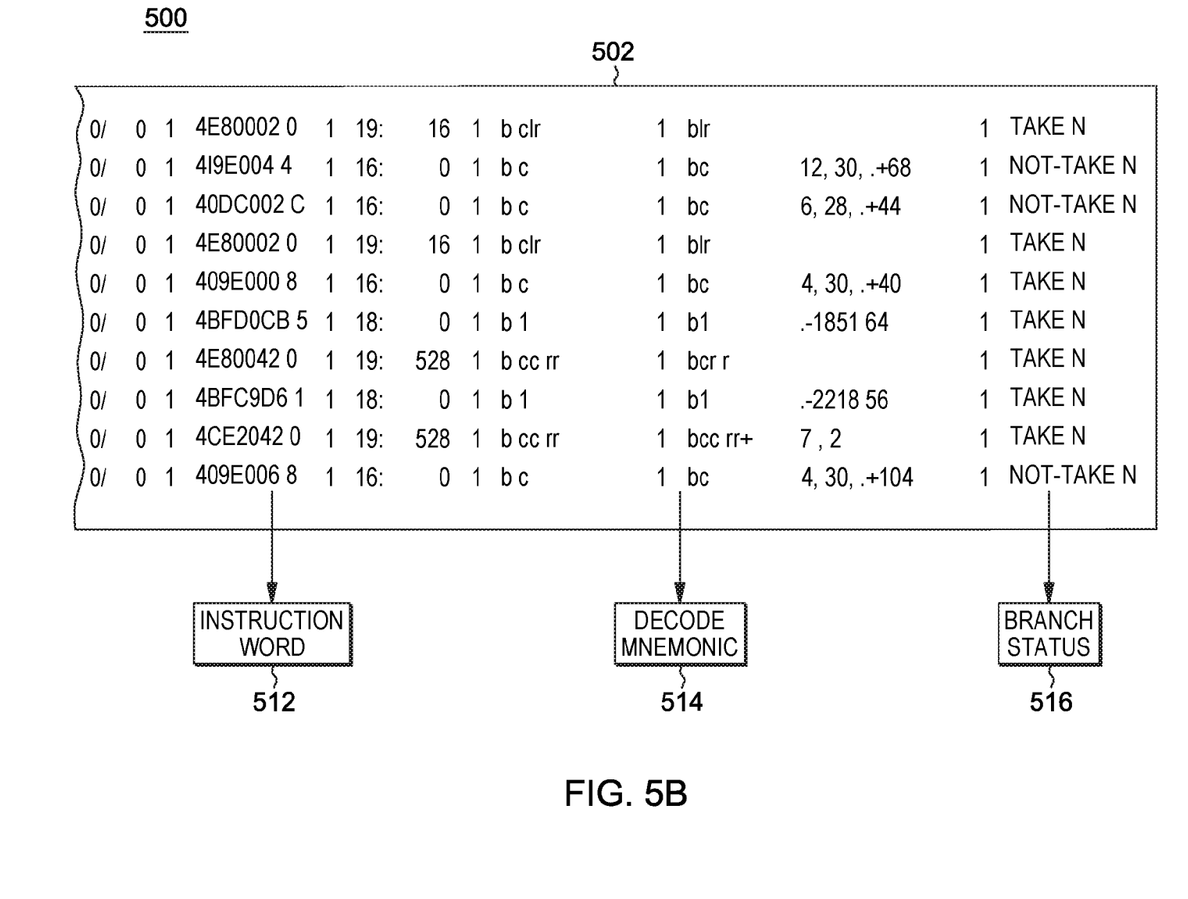

As shown in FIGS. 5A and 5B, diagram 500 includes: data table (also called "branch trace") 502; instruction count column 504; instruction address column 506; direct branch target address column 508; actual target address column 510; instruction word column 512; decode mnemonic column 514; and branch status column 516. Diagram 500 represents a sample branch trace which shows various details 504, 506, 508, 510, 512, 514, 516 available in the branch trace 502.

Figure 6:
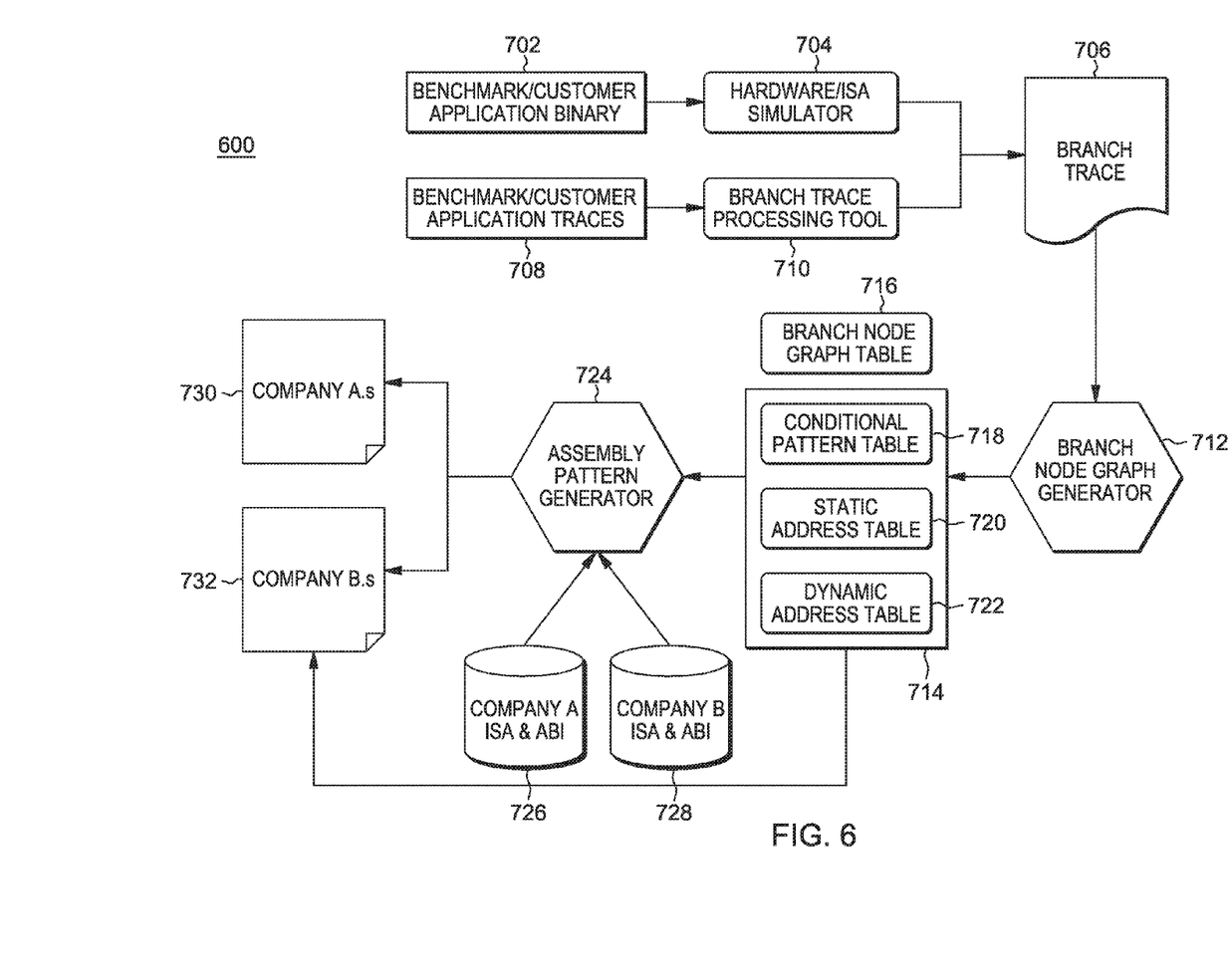
FIG. 6 is a schematic view of a second embodiment of a system according to the present invention.

As shown in FIG. 6, system 600 includes benchmark/customer application binary 702; hardware/ISA simulator 704; branch trace 706; benchmark/customer application traces 708; branch trace processing tool 710; branch node graph generator 712; file 714; branch node graph table 716; conditional pattern table 718; static address table 720; dynamic address table 722; assembly pattern generator 724; company A ISA (industry standard architecture) and ABI (application binary interface) storage 726; company B ISA and ABI storage 728; company A.s file 730; and company B.s file 732.

Processing begins when benchmark/customer application binary 702 is fed to hardware/ISA simulator 704 where the binary is run by the software. Alternatively, the benchmark/customer application traces 708 are processed through the branch trace processing tool 710. Output from the hardware/ISA simulator 704 and branch trace processing tool 710 become branch traces 706 which are then processed by the branch node graph generator 712. Processing continues where the branch node graph generator 712 generates branch node graph table 716 and file 714. Table 716 contains all the information about all branch nodes or basic block nodes and is the main information source for the assembly pattern generator 724. File 714 contains three (3) supporting files which are the conditional pattern table 718, static address table 720 and dynamic address table 722. Conditional pattern table 718 contains a sequence of "Taken" and "Non-Taken", in execution order from the trace, for branches that are "DYN" (dynamic) (that is, the branches that are not always either Taken or NT (not taken)). The conditional pattern table 718 is used by the assembly pattern generator 724 during execution of the generated assembly language to recreate the T/NT order/pattern exactly as in the trace. Static address table 720 contains indirect branches that always branch to a particular node and require the address of the node to be available for loading into the appropriate link register/count register (LR/CTR). This information is maintained with the help of the static address table 720. Dynamic address table 722 holds the sequence of varying target addresses for IDYN (dynamic indirect address) branch nodes. The conditional pattern table 718, static address table 720 and dynamic address table 722 are memory-mapped and used during execution of the ".s file". The data is then processed by the assembly pattern generator 724 using input from "company A" ISA and ABI storage 726 as well as using input from "company B" ISA and ABI storage 728. The output from assembly pattern generator 724 generates the "company A.s" file 730 as well as the "company B.s" file 732.

Figure 7A:
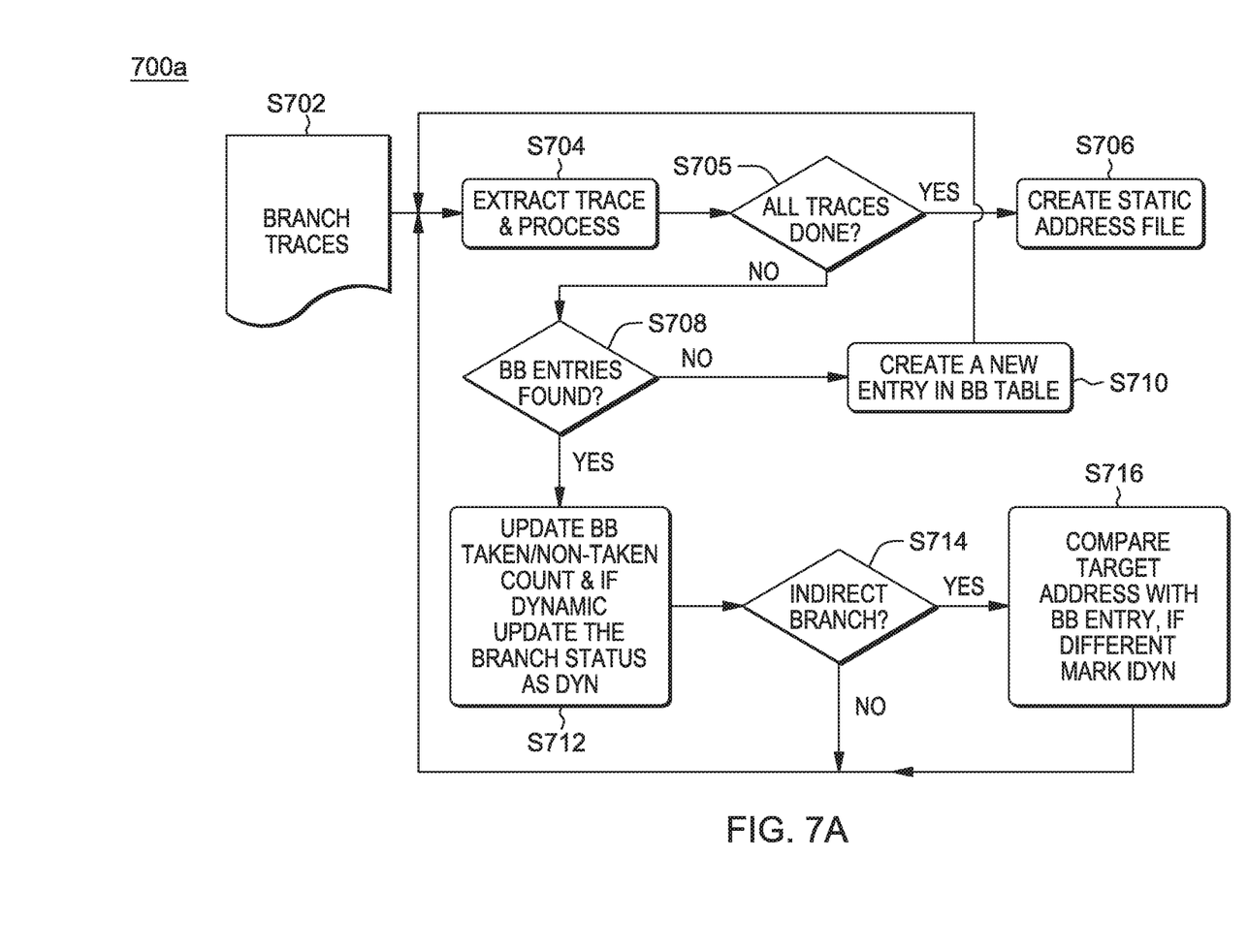
FIG. 7A is a flowchart showing a first portion of a second embodiment of a method according to the present invention.
Figure 7B:
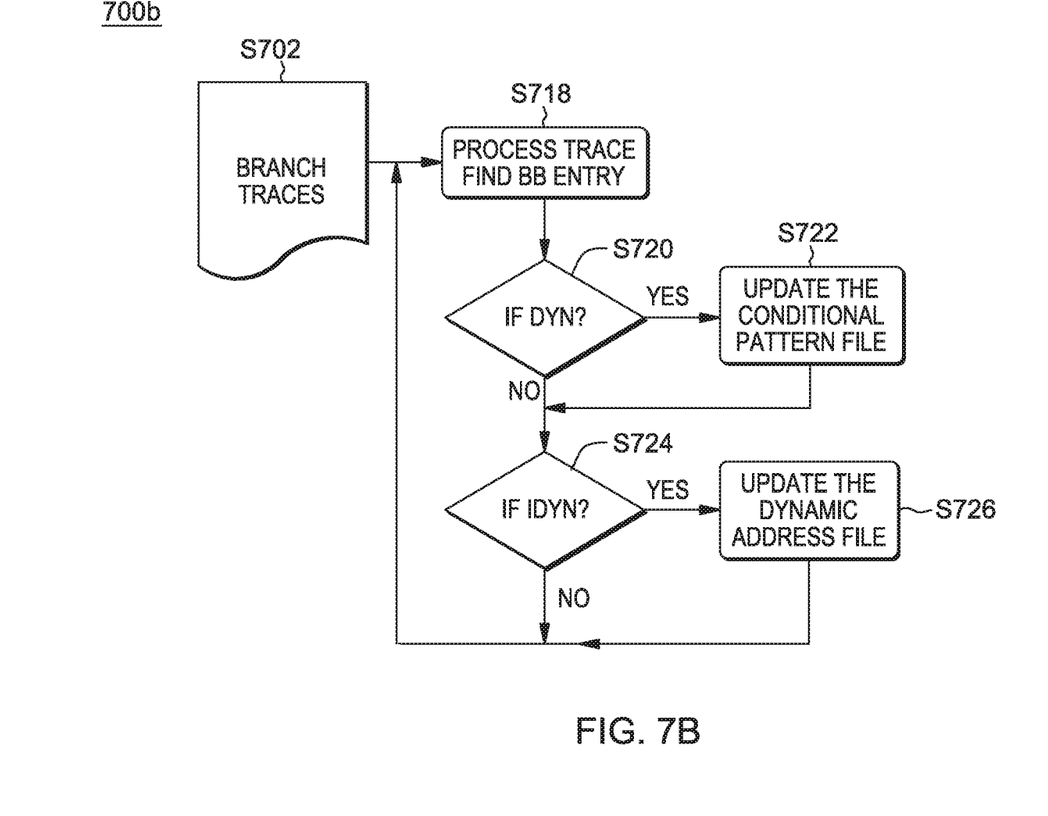
FIG. 7B is a flowchart showing a second portion of the second embodiment method.

The detailed implementation of the branch node graph generator (FIG. 6, block 712) is represented and is shown in FIGS. 7A and 7B. FIG. 7A illustrates pass 1 of the software, and FIG. 7B illustrates pass 2 of the software. The two pass approach is adopted to optimize: (i) the generation of the branch node graph table (FIG. 6, block 716); (ii) the conditional pattern table (FIG. 6, block 718); and (iii) the dynamic address table (FIG. 6, block 722).

As shown in FIG. 7A, flowchart 700a is the first processing step (pass 1) which begins at step S702 where branch traces are sent to step S704 where extracting the trace and processing is performed by the software. Processing continues to step S705 where the software determines if all traces have been extracted and processed. If yes (Y), the static address file is created in step S706. If no (N), processing continues to step S708 where a determination is made by the software if basic block (BB) entry corresponding to the current branch has been found. If no (N), a new entry is created in the BB table by the software, step S710, and processing returns to step S704. If yes (Y), the software updates the BB Taken/Non-Taken count, step S712, and if dynamic, the software also updates the branch status as DYN (dynamic). Processing continues to step S714 where the software determines if the branch is indirect. If yes (Y), processing continues to step S716 where the software compares the target address with the BB entry, and if they are different, the software updates the data as IDYN (dynamic indirect). Processing is then returned to step S704. If no (N), processing returns to step S704.

As shown in FIG. 7B, flowchart 700b is the second processing step (pass 2) of the software which begins at step S702, where branch traces are sent to step S718, where the trace is processed by the software to find BB entries. Processing continues to step S720 where the software determines if the entry is DYN (dynamic). If yes (Y), the software continues to step S722 where the software updates the conditional pattern file. If no (N), processing continues to step S724 where the software determines if the entry is IDYN (indirect dynamic). If yes (Y), processing continues to step S726, where the software updates the dynamic address file. Processing is then returned to step S718. If no (N), processing returns to step S718.

Figure 8:
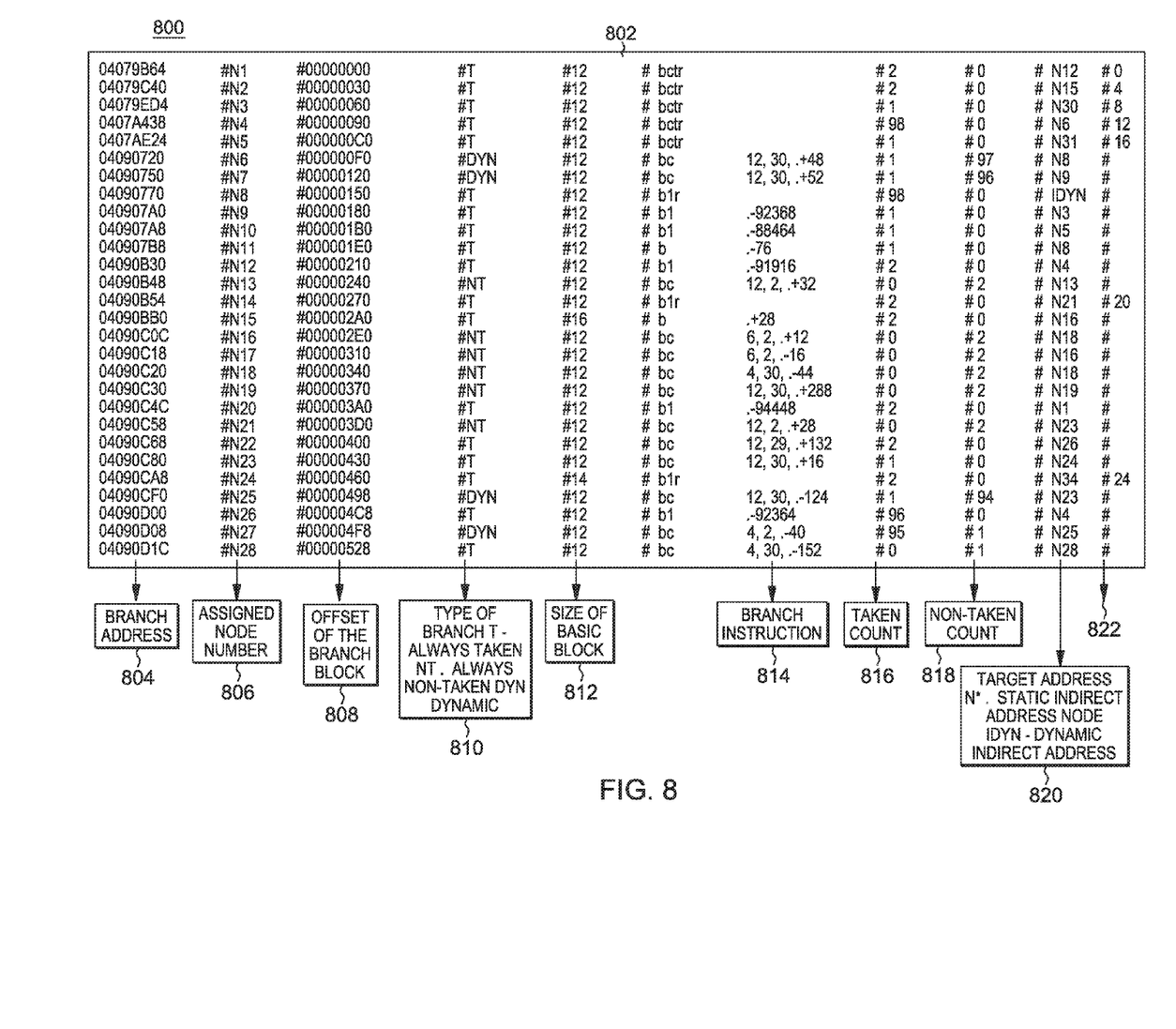
FIG. 8 is a diagram helpful in understanding various embodiments according to the present invention.

As shown in FIG. 8, diagram 800 includes: data table 802; branch address column 804; assigned node number column 806; offset of the branch block column 808; type of branch column 810 (where T=always, NT=always non-taken and DYN=dynamic); size of basic block column 812; branch instruction column 814; taken count column 816; non-taken count column 818; and target address column 820 (where N*=static indirect address node and IDYN=dynamic indirect address); and data column 822.

Further with respect to FIG. 8, screenshot view 800, for a given fixed target indirect branch, the information on "the node to branch to", and the index in the static address table (FIG. 6, block 720), where the target node address information is present, is given by target address column 820 and data column 822. The branch node graph table 802 is fed to the assembly pattern generator (FIG. 6, block 724) to generate the assembly file for various architectures. The assembly file generated can be executed in the hardware to evaluate the branch performance across generations of microarchitecture and also to evaluate their competitors design.

Some embodiments of the present invention may further include one, or more, of the following features, characteristics and/or advantages: (i) recreation of an exact branch pattern, in an assembly language format, for any ISA, from a performed trace of a binary, generated for any architecture; (ii) preservation of different types and mix of branch instructions (direct, indirect, etc.) in resultant assembly code; and/or (iii) recreation of an observed branch pattern in a workload, to study the performance improvements in branch prediction.

Some embodiments of the present invention may further include one, or more, of the following features, characteristics and/or advantages: (i) addresses a key difficulty in comparing two different processors control flow prediction capabilities, that is, branch prediction efficiency, by executing similar patterns of control flow; (ii) analyzes of "same control flow patterns" between two (2) different processors where the competitive strengths and weakness between them can be identified; (iii) allows building a graph-like program behavior recreation that holds the essence of branch behavior (that is, its history; (iv) graph-like program behavior is converted to assembly language that can run on multiple target hardware by using instructions from the different ISAs; and/or (v) allows creation of a graph-like program flow recreation, which is easily convertible to an assembly language, and can run on multiple targets.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Multiple platforms: can differ in ISA and microarchitecture.

Benchmark code set: a benchmark code set may correspond to, for example, a CPU (central processing unit)—one example of a benchmark code set for a CPU is SPECCPU.

Non-control-flow instruction: one example would be a floating point instruction.

What is claimed is:

1. A method comprising:
    generating a branch node graph, by a branch node graph generator machine logic set, based, at least in part, upon a set of branch traces;
    generating a first assembly pattern file, for use with a first instruction set architecture (ISA)/microarchitecture set, by an assembly pattern generator machine logic set, based, at least in part, upon the branch node graph;
    running the assembly pattern file on the first ISA/microarchitecture set to obtain first execution results; and
    generating a second assembly pattern file, for use with a second ISA/microarchitecture set, by an assembly pattern generator machine logic set, based, at least in part, upon the branch node graph;
    wherein:
    the generation of the first assembly pattern file uses a first application binary interface data set, specific to the first ISA/microarchitecture set, so that the assembly pattern file can run on the first ISA/microarchitecture set; and
    the generation of the second assembly pattern file uses a second application binary interface data set, specific to the second ISA/microarchitecture set, so that the assembly pattern file can run on the second ISA/microarchitecture set.

2. The method of claim 1 wherein the first and second ISA/microarchitecture sets have a common ISA and are different in microarchitecture type.

3. The method of claim 2 further comprising:
    running the second assembly pattern file on the second ISA/microarchitecture set to obtain second execution results; and
    comparing the first execution results with the second execution results.

4. The method of claim 3 wherein the first and second execution results relate to branch prediction performance of the first and second ISA/microarchitecture sets, respectively.

5. A method comprising:
    generating a branch node graph, by a branch node graph generator machine logic set, based, at least in part, upon a set of branch traces;
    generating a first assembly pattern file, for use with a first instruction set architecture (ISA)/microarchitecture set, by an assembly pattern generator machine logic set, based, at least in part, upon the branch node graph; and
    running the assembly pattern file on the first ISA/microarchitecture set to obtain first execution results;
    wherein:
    the generation of the first assembly pattern file uses data from the following tables: (i) a conditional pattern table, (ii) a static address table, and (iii) a dynamic address table; and
    the running of the first assembly pattern file on the first ISA/microarchitecture set uses data from the following tables: (i) the conditional pattern table, (ii) the static address table, and (iii) the dynamic address table.

* * * * *